(12) United States Patent
Son et al.

(10) Patent No.: US 10,040,420 B2
(45) Date of Patent: Aug. 7, 2018

(54) MOTORIZED SEAT BELT SYSTEM (71) Applicant: Hyundai Motor Company, Seoul (KR)

(72) Inventors: Sang Ock Son, Gyeonggi-do (KR); Soo Chul Lee, Gyeonggi-do (KR)

(73) Assignee: Hyundai Motor Corporation, Seoul (KR)

( * ) Notice: Subject to any disclaimer, the term of this patent is extended or adjusted under 35 U.S.C. 154(b) by 50 days.

(21) Appl. No.: 15/291,904

(22) Filed: Oct. 12, 2016

(65) Prior Publication Data
US 2017/0327078 A1 Nov. 16, 2017

(30) Foreign Application Priority Data
May 11, 2016 (KR) .......................... 10-2016-0057416

(51) Int. Cl.
*B60R 22/46* (2006.01)
*B60R 22/44* (2006.01)

(52) U.S. Cl.
CPC ............. *B60R 22/46* (2013.01); *B60R 22/44* (2013.01); *B60R 2022/4473* (2013.01); *B60R 2022/4666* (2013.01); *B60R 2022/4685* (2013.01)

(58) Field of Classification Search
CPC ..... B60R 22/46; B60R 22/4676; B60R 22/44; B60R 2022/4473; B60R 2022/4666; B60R 2022/4685
See application file for complete search history.

(56) References Cited

U.S. PATENT DOCUMENTS

| | | | |
|---|---|---|---|
| 6,682,098 B2 | 1/2004 | Specht | |
| 6,786,294 B2 | 9/2004 | Specht | |
| 9,333,941 B2 * | 5/2016 | Ikeda | ...................... B60R 22/34 |
| (Continued) | | | |

FOREIGN PATENT DOCUMENTS

| | | |
|---|---|---|
| JP | 2003-500273 A | 1/2003 |
| JP | 2005-231388 A | 9/2005 |
| JP | 2011-230691 A | 11/2011 |
| (Continued) | | |

OTHER PUBLICATIONS

Lee, Kangseok, et al., "A design of linear state observers for motorized seat belt system." Transactions of the Korean Society of Automotive Engineers, (2012) vol. 20, No. 3, pp. 58-66.

*Primary Examiner* — Keith J Frisby
(74) *Attorney, Agent, or Firm* — Mintz Levin Cohn Ferris Glovsky and Popeo, P.C.; Peter F. Corless (57) ABSTRACT

A motorized seat belt system includes: a spindle around which webbing is wound; an output gear connected to the spindle through a power transmission shaft; a torsion portion provided on the power transmission shaft or the output gear; a motor which transmits rotational power to the spindle; first and second reduction gears which are connected to an output shaft of the motor and transmit rotational power of the motor to the output gear; a first rotation amount detecting sensor that measures a rotation angle and a rotation direction of the power transmission shaft; a second rotation amount detecting sensor that measures a rotation angle and a rotation direction with respect to a rim portion of the first reduction gear; and a controller which controls output of the motor based on detection signals from the first rotation amount detecting sensor and the second rotation amount detecting sensor.

8 Claims, 4 Drawing Sheets (56) References Cited

U.S. PATENT DOCUMENTS

2006/0231663 A1* 10/2006 Burkart .................. B60R 22/46
242/374
2008/0211442 A1* 9/2008 Odate .................... B60R 22/46
318/449

FOREIGN PATENT DOCUMENTS

| JP | 2013-078975 A | 5/2013 |
| KR | 10-0931162 B1 | 12/2009 |
| KR | 10-0979324 B1 | 8/2010 |

* cited by examiner

MOTORIZED SEAT BELT SYSTEM

CROSS-REFERENCE TO RELATED APPLICATION

This application claims under 35 U.S.C. § 119(a) the benefit of Korean Patent Application No. 10-2016-0057416 filed on May 11, 2016, the entire contents of which are incorporated herein by reference.

BACKGROUND

(a) Technical Field

The present invention relates to a motorized seat belt system, more particularly, to a motorized seat belt system which allows operations of retracting and extending webbing smoothly without interruption.

(b) Description of the Related Art

In general, a seat belt system for a vehicle includes a retractor which stores webbing having a predetermined length such that the webbing may be extended, a tongue which is mounted at an end of the webbing, and a buckle into which the tongue is inserted and fastened, and a passenger fastens a seat belt by pulling the webbing and fastening the tongue to the buckle at the same time.

The retractor includes a spindle around which the webbing having a predetermined length is extendably wound, and a pretensioner which instantaneously winds the webbing wound around the spindle and controls force of the passenger who is about to move forward at the time of a collision.

Recently, in addition to the pretensioner, a motorized seat belt (MSB) system, which prevents webbing slack (a state in which the webbing is not tightly attached to the passenger's body but is hung loosely), has been adopted to quickly retract the webbing after the passenger unfastens the seat belt, and to warn the passenger (e.g., a driver) of an emergency situation such as lane departure due to distracted driving.

An operation flow of the motorized seat belt includes a step of determining whether to drive a motor in order to retract the belt webbing based on mapped logic stored in a controller of an engine control unit (ECU), e.g., a situation in which the webbing is retracted while being wound as the passenger releases the buckle, a situation in which the webbing is retracted when predetermined time passed after the passenger pulls the webbing and fastens the buckle, etc.; a step of engaging a clutch for power transmission between the motor and the spindle around which the webbing is wound; a step of driving the motor, by the controller, and simultaneously transmitting rotational force of the motor via the clutch to the spindle around which the webbing is wound; and a step of rotating the spindle such that the webbing is wound in a retraction direction, whereby the seat belt webbing is tightly attached to the passenger's body.

In this case, the situation in which the webbing is retracted while being wound as the passenger releases the buckle is an initial state in which the seat belt webbing is stored on the spindle.

As described above, since the webbing remains attached tightly to the passenger's body by the operation of the motorized seat belt, the passenger may be easily restricted by the webbing in a situation such as a sudden stop.

However, the drawback to the motorized seat belt in the related art is that it is impossible to control the webbing in an extension direction, and it is possible to control the webbing in the retraction direction by using power from the motor only in a case in which the webbing slack occurs as described above.

That is, there is a drawback in that the operation of extending the webbing is performed only by the passenger directly pulling the webbing, and it is impossible to extend the webbing by using power from the motor.

The above information disclosed in this Background section is only for enhancement of understanding of the background of the invention and therefore it may contain information that does not form the prior art that is already known in this country to a person of ordinary skill in the art.

SUMMARY

The present invention provides a motorized seat belt system which enables operations of retracting and extending webbing to be performed by using power from a motor, and enables the operations of retracting and extending the webbing to be performed smoothly without interruption by forming a torsion portion, which is torsionally deformed, on a power transmission gear between the motor and a spindle around which the webbing is wound.

In one aspect, the present invention provides a motorized seat belt system including: a spindle around which webbing is wound; an output gear which is connected to the spindle through a power transmission shaft; a torsion portion which is provided on the power transmission shaft or the output gear; a motor which transmits rotational power to the spindle; a reduction gear unit which is connected to an output shaft of the motor and transmits rotational power of the motor to the output gear; a first rotation amount detecting sensor which is mounted on the power transmission shaft and measures a rotation angle and a rotation direction of the power transmission shaft; a second rotation amount detecting sensor which is mounted on the output shaft and measures a rotation angle and a rotation direction with respect to a rim portion of a first reduction gear; and a controller which controls output of the motor based on detection signals from the first rotation amount detecting sensor and the second rotation amount detecting sensor.

In a preferred embodiment, the torsion portion may be implemented by configuring the power transmission shaft as a torsion bar.

In another preferred embodiment, the torsion portion may be implemented by making a plurality of spokes, which connects a rotational shaft and a rim portion of the output gear, by using an elastic material.

In still another preferred embodiment, a Hall sensor, which has a pair of Hall integrated circuits disposed at an outer circumferential portion of a magnetic body, may be used as the first rotation amount detecting sensor and the second rotation amount detecting sensor in order to detect a forward and reverse rotation amount.

In yet another preferred embodiment, the controller may select one of a webbing retraction mode and a webbing extension mode, and increase or decrease the output of the motor based on the detection signals from the first rotation amount detecting sensor and the second rotation amount detecting sensor in the selected mode.

In still yet another preferred embodiment, the controller may select the webbing retraction mode when the webbing is not additionally extended for a predetermined period of time after the webbing is extended or when the webbing is not additionally extended for a predetermined period of time after a passenger fastens a buckle.

In a further preferred embodiment, the controller may select the webbing retraction mode or the webbing extension mode based on signals associated with vehicle states including whether a buckle is fastened, whether a passenger is seated in a seat, open and closed states of a door, and an engine start condition.

In another further preferred embodiment, the controller may convert the webbing retraction mode into the webbing extension mode when a value obtained by subtracting the rotation amount detected by the second rotation amount detecting sensor from the rotation amount detected by the first rotation amount detecting sensor exceeds a critical value in the webbing retraction mode.

Through the aforementioned technical solutions, the present invention provides the effects below.

First, both of the operations of retracting and extending the webbing may be performed by using power from the motor.

Second, a separate torsion portion is formed on a power transmission gear that connects the motor and the spindle around which the webbing is wound, and as a result, the operations of retracting and extending the webbing may be performed smoothly without interruption.

Third, when the webbing is retracted or extended, a difference between the rotation angle of the power transmission shaft connected with the spindle and the rotation angle of the first reduction gear connected with the motor is detected, and the output of the motor is controlled to be increased and decreased, and as a result, it is possible to constantly control the operation of extending and retracting the webbing, and therefore, it is possible to optimize sensitivity recognized by the passenger when the passenger extends and retracts the webbing.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 1:
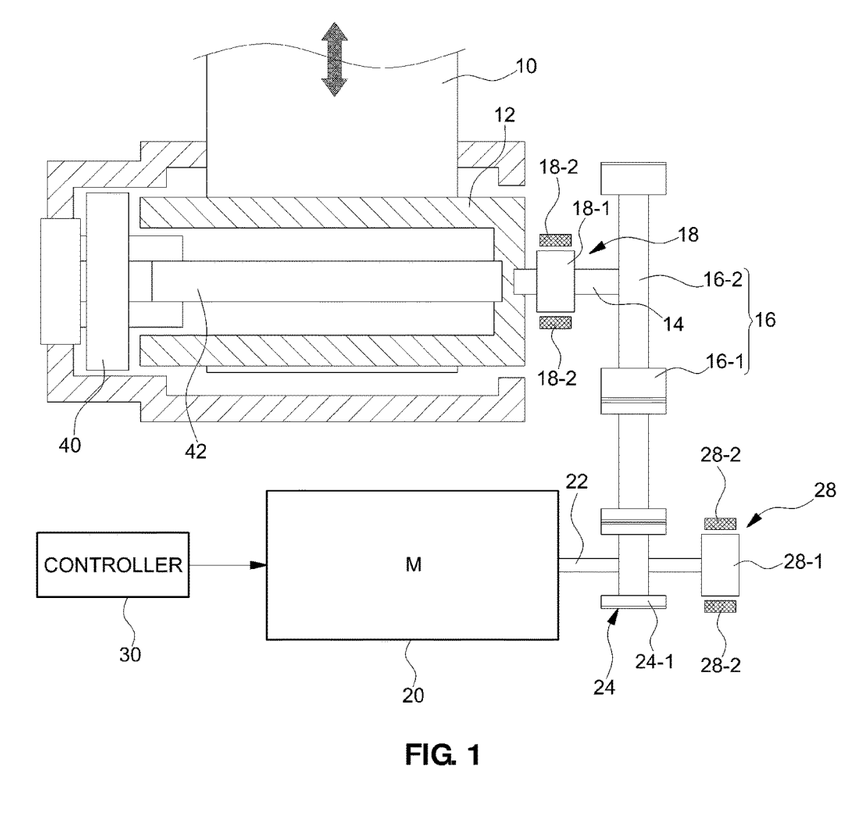
FIG. 1 is a configuration diagram illustrating a motorized seat belt system according to the present invention.

FIG. 1 is a configuration diagram illustrating a motorized seat belt system according to the present invention.

In FIG. 1, reference numeral 10 indicates seat belt webbing, and reference numeral 12 indicates a spindle around which the webbing is wound.

A pretensioner 40 serves to instantaneously wind the webbing around the spindle by using a torsion bar 42 and control force of a passenger who is about to move forward at the time of a collision.

The present invention provides a motorized seat belt system which allows both an operation of extending the webbing 10 being unwound from the spindle 12 and an operation of retracting the webbing 10 being wound around the spindle 12 to be performed by power from a motor 20. The motor 20 for transmitting rotational power is connected to the spindle 12 through power transmission gears.

In particular, an output gear 16 is connected to the spindle 12 through a power transmission shaft 14, and a reduction gear unit, which transmits rotational power of the motor 20 to the output gear 16, is connected to an output shaft 22 of the motor 20.

Also, the reduction gear unit includes a first reduction gear 24 which is connected to the output shaft 22, and a second reduction gear 26 which is disposed between the first reduction gear 24 and the output gear 16, so as to enable power transmission between the first reduction gear 24 and the output gear 16. Further, the shapes, the number, and a reduction ratio of the reduction gears may be arbitrarily changed in accordance with properties of the system.

A first rotation amount detecting sensor 18, which measures a rotation angle and a rotation direction of the power transmission shaft 14, is mounted on the power transmission shaft 14, and a second rotation amount detecting sensor 28, which measures a rotation angle and a rotation direction with respect to a rim portion 24-1 of the first reduction gear 24, is mounted on the output shaft 22.

In this case, output ends of the first rotation amount detecting sensor 18 and the second rotation amount detecting sensor 28 are connected to a controller 30 so as to transmit signals to the controller 30 which controls output of the motor 20 based on detection signals from the respective sensors 18 and 28.

In particular, the first rotation amount detecting sensor 18 includes a magnetic body 18-1 mounted on the power transmission shaft 14, and two Hall integrated circuits (ICs) 18-2 disposed at an outer circumferential portion of the magnetic body 18-1. Likewise, the second rotation amount detecting sensor 28 also includes a magnetic body 28-1 mounted on the output shaft 22, and two Hall ICs 28-2 disposed at an outer circumferential portion of the magnetic body 28-1.

The reason why the two Hall ICs are disposed at each of the first rotation amount detecting sensor 18 and the second rotation amount detecting sensor 28 as described above is to detect a forward and reverse rotation of the power transmission shaft 14 connected to the spindle 12 and detect a forward and reverse rotation of the output shaft 22 connected to the motor 20.

Meanwhile, a torsion portion, which may be twisted when the webbing is retracted or extended, is provided on the power transmission shaft 14 or the output gear 16.

Figure 2:
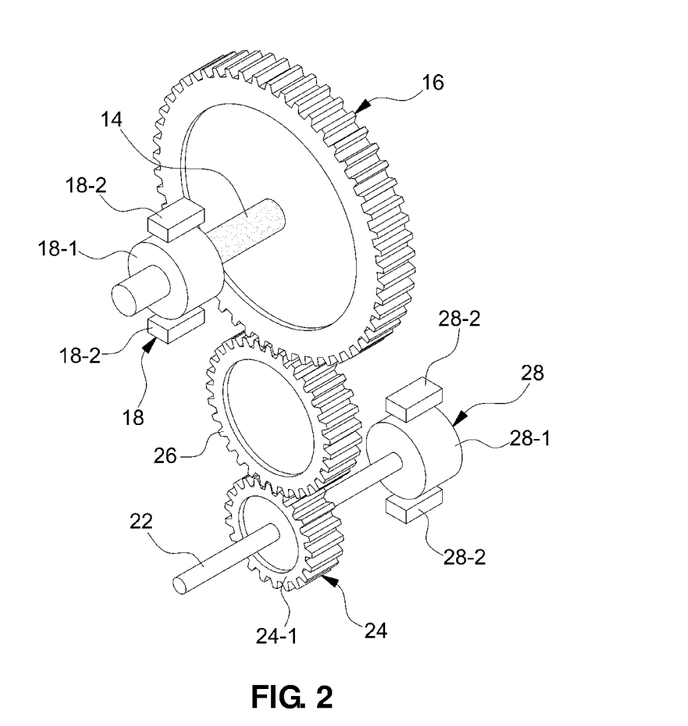
FIGS. 2 and 3 are perspective views illustrating a state in which a torsion portion is provided in the motorized seat belt system according to the present invention.

As shown in FIG. 2, the torsion portion according to the exemplary embodiment of the present invention is implemented by configuring the power transmission shaft 14 as a torsion bar.

Figure 3:
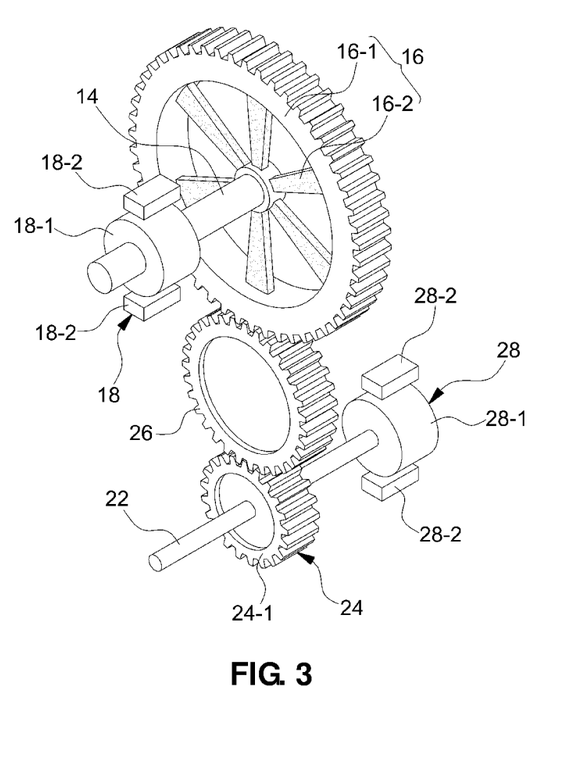

As shown in FIG. 3, the torsion portion according to another exemplary embodiment of the present invention is implemented by making a plurality of spokes 16-2, which connects a rotational shaft and a rim portion 16-1 of the output gear 16, by using an elastic material (e.g., rubber material).

Here, an operation flow of the motorized seat belt system according to the present invention, which includes the aforementioned configurations, will be described below.

First, the controller 30 selects a webbing retraction mode or a webbing extension mode.

In particular, when signals associated with vehicle states including whether a buckle is fastened, whether a passenger is seated in a seat, open and closed states of a door, and an engine start condition are inputted to the controller 30, the controller 30 selects the webbing retraction mode or the webbing extension mode based on the inputted signals, and then controls the output of the motor.

For example, if the passenger separates a tongue from the buckle in order to release the seat belt, the controller selects the webbing retraction mode, and if the passenger is seated in the seat and closes the door, the controller selects the webbing extension mode in which the webbing is extended to allow the passenger to fasten the seat belt, and thereafter the controller controls the output of the motor.

Figure 4:
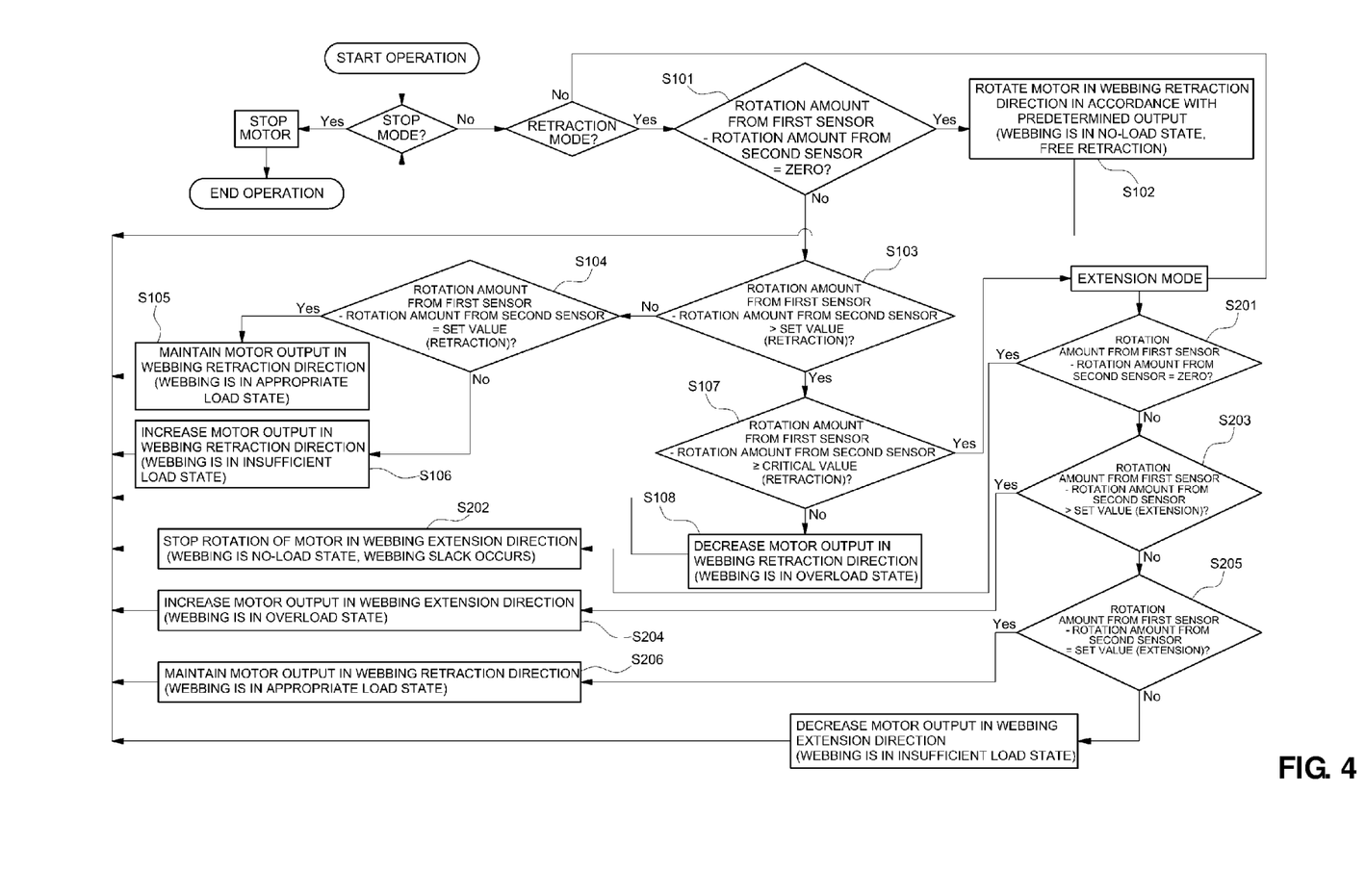
FIG. 4 is a flowchart illustrating an example of controlling an operation flow of the motorized seat belt system according to the present invention.

Here, an example of controlling the webbing retraction mode and the webbing extension mode, which is performed by being controlled by the controller, will be described below with reference to a flowchart depicted in FIG. 4.

Webbing Retraction Mode

When the webbing retraction mode is selected, the controller 30 drives the motor 20 in order to retract the webbing, receives the detection signals from the first rotation amount detecting sensor 18 and the second rotation amount detecting sensor 28, and controls the output of the motor 20 based on the received signals.

First, the controller 30 measures a difference between the rotation amount detected by the first rotation amount detecting sensor 18 and the rotation amount detected by the second rotation amount detecting sensor 28 (S101), and if the rotation amount detected by the first rotation amount detecting sensor 18 and the rotation amount detected by the second rotation amount detecting sensor 28 are equal to each other, the controller 30 rotates the motor 20 in a webbing retraction direction, and simultaneously, controls the output of the motor 20 in accordance with the predetermined output (S102).

The state in which the rotation amount detected by the first rotation amount detecting sensor 18 and the rotation amount detected by the second rotation amount detecting sensor 28 are equal to each other means that the webbing is in a no-load state (e.g., a state in which the passenger does not hold or pull the webbing).

Therefore, the first rotation amount detecting sensor 18 detects the rotation amount of the spindle 12 when the spindle 12 rotates in the webbing retraction direction, and the second rotation amount detecting sensor 28 detects rotational force when the motor 20 operates to retract the webbing, and as a result, if the rotation amount detected by the first rotation amount detecting sensor 18 and the rotation amount detected by the second rotation amount detecting sensor 28 are equal to each other, the webbing is easily retracted by power from the motor.

A difference between the rotation amount detected by the first rotation amount detecting sensor 18 and the rotation amount detected by the second rotation amount detecting sensor 28 is compared with a set value (S103), and if it is determined that the difference between the rotation amount detected by the first rotation amount detecting sensor 18 and the rotation amount detected by the second rotation amount detecting sensor 28 is equal to the set value (S104), the output of the motor is maintained in the webbing retraction direction (S105), but if the difference is smaller than the set value, the output of the motor is increased in the webbing retraction direction so that the webbing is more quickly wound (S106).

In this case, as a result of step S103, if the difference between the rotation amount detected by the first rotation amount detecting sensor 18 and the rotation amount detected by the second rotation amount detecting sensor 28 is greater than the set value, the difference between the rotation amount detected by the first rotation amount detecting sensor 18 and the rotation amount detected by the second rotation amount detecting sensor 28 is compared with a critical value (limit value) (S107), and if the difference is smaller than the critical value, it is determined that the webbing is in an overload state (e.g., a state in which the passenger holds the webbing), and the output of the motor is decreased because the motor may be overloaded (S108).

In contrast, as a result of the comparison between the critical value (limit value) and the difference between the rotation amount detected by the first rotation amount detecting sensor 18 and the rotation amount detected by the second rotation amount detecting sensor 28, if the difference is greater than the critical value, it is determined that the webbing is present in or above the overload state (e.g., a state in which the passenger holds and pulls the webbing to extend the webbing), and the controller selects the webbing extension mode.

Webbing Extension Mode

When the webbing extension mode is selected, the controller 30 first measures the difference between the rotation amount detected by the first rotation amount detecting sensor 18 and the rotation amount detected by the second rotation amount detecting sensor 28 (S201), and if the rotation amount detected by the first rotation amount detecting sensor 18 and the rotation amount detected by the second rotation amount detecting sensor 28 are equal to each other, the controller 30 controls and stops the motor 20 (S202).

In this case, the state in which the rotation amount detected by the first rotation amount detecting sensor 18 and the rotation amount detected by the second rotation amount detecting sensor 28 are equal to each other in the webbing extension mode may be determined as a state in which webbing slack occurs and the webbing is in a no-load state, that is, a state in which the passenger does not pull the webbing or does not intend to further pull the webbing, and therefore the controller controls and stops the motor 20.

The difference between the rotation amount detected by the first rotation amount detecting sensor 18 and the rotation amount detected by the second rotation amount detecting sensor 28 is compared with a set value (S203), and if it is determined that the difference between the rotation amount detected by the first rotation amount detecting sensor 18 and the rotation amount detected by the second rotation amount detecting sensor 28 is greater than the set value, the output of the motor is increased in the webbing extension direction in order to supplement force for extending the webbing (S204).

That is, because the webbing becomes over-loaded when the passenger holds and extends the webbing, the output of the motor is increased in the webbing extension direction in order to supplement force for extending the webbing (S204).

In this case, as a result of step S203, if the difference between the rotation amount detected by the first rotation amount detecting sensor 18 and the rotation amount detected by the second rotation amount detecting sensor 28 is smaller than the set value, it is determined whether the difference between the rotation amount detected by the first rotation amount detecting sensor 18 and the rotation amount detected by the second rotation amount detecting sensor 28 is equal to the set value (S205), and if the difference is equal to the set value, it is determined that the webbing is in an appropriate load state (e.g., a state in which the passenger extends the webbing while recognizing appropriate tension), and the controller maintains the output of the motor in the webbing retraction direction (S206).

In contrast, as a result of determining whether the difference between the rotation amount detected by the first rotation amount detecting sensor 18 and the rotation amount detected by the second rotation amount detecting sensor 28 is equal to the set value in step S205, if the difference is not equal to the set value, it is determined that the webbing is in an insufficient load state (e.g., a state in which the passenger pulls and extends the webbing while recognizing that the webbing is somewhat loose compared to an appropriate state), and the controller controls the output of the motor in the webbing extension direction and decreases the output of the motor (S207).

As described above, when the webbing is retracted or extended, a difference between the rotation angle of the power transmission shaft connected with the spindle and the rotation angle of the first reduction gear connected with the motor is detected, and the output of the motor is controlled to be increased or decreased, and as a result, it is possible to constantly control the operations of extending and retracting the webbing, and therefore, it is possible to optimize sensitivity recognized by the passenger when the passenger extends and retracts the webbing.

Meanwhile, during the operations of retracting and extending the webbing, an instantaneous change in webbing retraction and extension directions, a rapid change in force in the webbing retraction and extension directions, and the like may occur in a case in which the passenger pulls the webbing in a state in which the webbing is wound around the spindle, or the passenger suddenly pulls the webbing again at the moment when the webbing is retracted, or the passenger suddenly pulls the webbing at a higher speed while the webbing is pulled and extended by the passenger.

According to the present invention, even though an instantaneous change in webbing retraction and extension directions, a rapid change in force in the webbing retraction and extension directions, and the like occurs as described above, the torsion portion (i.e., the power transmission shaft 14 being a torsion bar) connected to the spindle or the plurality of spokes 16-2, which connects the rotational shaft and the rim portion 16-1 of the output gear 16, performs torsional motion, and as a result, the operations of retracting and extending the webbing may be performed smoothly without interruption, and it is possible to improve sensitivity recognized by the passenger when the passenger retracts and extends the webbing.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:
1. A motorized seat belt system, comprising:
a spindle around which webbing is wound;
an output gear which is connected to the spindle through a power transmission shaft;
a torsion portion which is provided on the power transmission shaft or the output gear;
a motor which transmits rotational power to the spindle;

a reduction gear unit which is connected to an output shaft of the motor and transmits rotational power of the motor to the output gear;

a first rotation amount detecting sensor which is mounted on the power transmission shaft and measures a rotation angle and a rotation direction of the power transmission shaft;

a second rotation amount detecting sensor which is mounted on the output shaft and measures a rotation angle and a rotation direction with respect to a rim portion of a first reduction gear; and a controller which controls output of the motor based on detection signals from the first rotation amount detecting sensor and the second rotation amount detecting sensor.

2. The motorized seat belt system of claim 1, wherein the torsion portion is implemented by configuring the power transmission shaft as a torsion bar.

3. The motorized seat belt system of claim 1, wherein the torsion portion is implemented by making a plurality of spokes, which connects a rotational shaft and a rim portion of the output gear, by using an elastic material.

4. The motorized seat belt system of claim 1, wherein a Hall sensor, which has a pair of Hall integrated circuits disposed at an outer circumferential portion of a magnetic body, is used as the first rotation amount detecting sensor and the second rotation amount detecting sensor in order to detect a forward and reverse rotation amount.

5. The motorized seat belt system of claim 1, wherein the controller selects one of a webbing retraction mode and a webbing extension mode, and increases or decreases the output of the motor based on the detection signals from the first rotation amount detecting sensor and the second rotation amount detecting sensor in the selected mode.

6. The motorized seat belt system of claim 5, wherein the controller selects the webbing retraction mode or the webbing extension mode based on signals associated with vehicle states including whether a buckle is fastened, whether a passenger is seated in a seat, open and closed states of a door, and an engine start condition.

7. The motorized seat belt system of claim 5, wherein the controller selects the webbing retraction mode when the webbing is not additionally extended for a predetermined period of time after the webbing is extended or when the webbing is not additionally extended for a predetermined period of time after a passenger fastens a buckle.

8. The motorized seat belt system of claim 5, wherein the controller converts the webbing retraction mode into the webbing extension mode when a value obtained by subtracting the rotation amount detected by the second rotation amount detecting sensor from the rotation amount detected by the first rotation amount detecting sensor exceeds a critical value in the webbing retraction mode.

* * * * *